(12) United States Patent
Bedo et al.

(10) Patent No.: US 9,922,058 B2
(45) Date of Patent: Mar. 20, 2018

(54) FAST PCA METHOD FOR BIG DISCRETE DATA

(71) Applicant: National ICT Australia Limited, Eveleigh, NSW (AU)

(72) Inventors: Justin Bedo, Eveleigh (AU); Adam Kowalczyk, Eveleigh (AU); Karin Klotzbuecher, Eveleigh (AU)

(73) Assignee: NATIONAL ICT AUSTRALIA LIMITED, Eveleigh, New South Wales (AU)

( * ) Notice: Subject to any disclaimer, the term of this patent is extended or adjusted under 35 U.S.C. 154(b) by 270 days.

(21) Appl. No.: 14/333,130

(22) Filed: Jul. 16, 2014

(65) Prior Publication Data

US 2015/0026134 A1    Jan. 22, 2015

(51) Int. Cl.
*G06F 19/00* (2011.01)
*G06F 17/30* (2006.01)

(52) U.S. Cl.
CPC ............... *G06F 17/30306* (2013.01)

(58) Field of Classification Search
USPC ..................................... 702/19, 20
See application file for complete search history.

(56) References Cited

U.S. PATENT DOCUMENTS

2008/0163824 A1    7/2008 Moser et al.

OTHER PUBLICATIONS

Kim et. al., Collaborative filtering based on iterative principal analysis, Expert Systems with Applications 28 (2005) 823-830.*
Liu et al., Comparison of five iterative imputation methods for multivariate classification, Chemometrics and Intelligent Laboratory Systems 120 (2013) 106-115.*
Price, A. L. et al. Principal components analysis corrects for stratification in genome-wide association studies. Nature Genetics 38,904-9 (2006).
Katarzyna Bryc, Wlodek Bryc, and Jack W Silverstein. Separation of the largest eigenvalues in eigenanalysis of genotype data from discrete subpopulations. arXiv preprint arXiv:1301.4511, 2013. Jan. 18, 2013.
Paul Geladi and Bruce R Kowalski. Partial least-squares regression: a tutorial. Analytica chimica acta. 185:1-17, 1986.
M. Andrecut, "Parallel GPU Implementation of Iterative PCA Algorithms", Institute for Biocomplexity and Informatics, University of Calgary, Canada, Nov. 7, 2008, 45 pages.

(Continued)

*Primary Examiner* — Cheyne D Ly (57) ABSTRACT

This disclosure is related to further approximating multiple data vectors of a dataset. The multiple data vectors are initially approximated by one or more stored principle components. A processor performs multiple iterations of determining an updated estimate of a further principle component based on the multiple data vectors that are initially approximated by the one or more stored principle components. The processor performs this step such that the updated estimate of the further principal component further approximates the dataset. In each iteration the processor constrains the updated estimate of the further principal component to be orthogonal to each of the one or more stored principal components. The data vectors of the dataset are not manipulated but remain the same data vectors that are approximated by the stored principal components.

8 Claims, 5 Drawing Sheets

(56) References Cited

OTHER PUBLICATIONS

Karin Klotzbuecher et al, "Iterative principal component analysis for population structure correction in large-scale datasets", NICTA Victoria Research Laboratory, University of Melbourne, Australia, 2013, 1 page.

* cited by examiner

FAST PCA METHOD FOR BIG DISCRETE DATA

TECHNICAL FIELD

This disclosure is related to approximating multiple data vectors of a dataset.

BACKGROUND ART

An increasing number of ideas, business models and business value relies on the paradigm of big data. Service providers offer analysis of big data, such as internet traffic or social network analysis (SNA) in order to extract insights into the underlying structure or trends in the data. Based on these insights, advertising campaigns or other business or research activities can be managed.

Big data service providers employ powerful data storage servers as well as processing servers, such as virtual machines in a cloud computing environment, in order to process the data and provide their services. However, the volume of the data causes difficulties in using existing methods to process the data.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

There is provided a computer implemented method for further approximating multiple data vectors of a dataset. The multiple data vectors are initially approximated by one or more stored principle components. The method comprises:
  performing multiple iterations of determining an updated estimate of a further principle component based on the multiple data vectors that are initially approximated by the one or more stored principle components,
  such that the updated estimate of the further principal component further approximates the dataset,
  wherein in each iteration determining the updated estimate of the further principle component comprises constraining the updated estimate of the further principal component to be orthogonal to each of the one or more stored principal components.

In many applications it is possible to determine a first (dominant) principal component and remove that first principal component from the dataset such that the remaining dataset is the residual error of approximating the data vectors of the dataset by the first principal component. The same procedure can then be repeated on the residual error to determine further principal components. It is a natural outcome that the further principal components are orthogonal to the first principal component.

However, in certain applications, such as when processing Genome-Wide-Association Study (GWAS) datasets, removing the data characterised by the first principal component causes a loss in desirable properties of the dataset, such as the discreetness of values and sparsity, which would otherwise allow efficient storage of the dataset.

It is therefore an advantage of the above method that the data vectors of the dataset are not manipulated but remain the same data vectors that are approximated by the stored principal components. This is achieved by constraining in each iteration the further principal component to be orthogonal to the stored principal components. As a result the further principal component does not tend towards the most dominant principal component of the dataset but to the most dominant principal component of the residual error but without manipulating the dataset.

Therefore, the desirable properties of the dataset are preserved and the dataset can be stored and processed more efficiently, which is a significant advantage when processing large datasets as commonly encountered in genomics, for example.

The method may further comprise determining a first linear combination of the multiple data vectors, wherein determining the updated estimate of the further principle component based on the multiple data vectors is based on the first linear combination of the multiple data vectors.

The method may further comprise determining a score based on a second linear combination of the multiple data vectors, wherein the first linear combination is based on the score and the second linear combination is based on the updated estimate of the further principal component.

Performing multiple iterations of determining the updated estimate of the further principle component may comprise repeating the steps of determining the updated estimate of the further principal component based on the score and of determining the score based on the updated estimate of the further principal component to iteratively update the score and the estimate of the further principal component until a convergence criterion is met.

The method may further comprise when the convergence criterion is met, adding the updated estimate of the further principal component to the one or more stored principal components.

The method may further comprise performing population structure correction based on the one or more stored principal components and the further principal component.

The dataset may be a Genome-Wide-Association Study dataset.

The method may further comprise storing the dataset as a packed binary representation on a data store.

Each of minor homozygote, major homozygote and heterozygote may be represented by a different binary value, which may be a two bit binary value.

The method may further comprise creating a graphical representation of the data set based on the stored principal components.

Software, when installed on a computer, causes the computer to perform the above method.

A computer system for further approximating multiple data vectors of a dataset comprises:
  a data store to store one or more principle components that initially approximate the data vectors;
  a processor to perform multiple iterations of determining an updated estimate of a further principle component based on the multiple data vectors that are initially approximated by the one or more stored principle components,
  such that the updated estimate of the further principal component further approximates the dataset,
  wherein in each iteration determining the updated estimate of the further principle component comprises constraining the updated estimate of the further principal component to be orthogonal to each of the one or more stored principal components.

Optional features described of any aspect of method, software or computer system, where appropriate, similarly apply to the other aspects also described here.

BRIEF DESCRIPTION OF DRAWINGS

An example will be described with reference to

FIG. 3b illustrates an approximation of the dataset of FIG. 3a.

BEST MODE FOR CARRYING OUT THE INVENTION

This disclosure describes a method and system for extracting principal components from large datasets. It is to be understood that principal components are vectors represented in computer hardware, such as stored on random access memory (RAM) or transmitted over a Direct Media Interface (DMI), as physical bit values. Throughout this specification the terms principal components and principal eigenvectors are used interchangeably.

In one example, principle components of Genome-Wide Association Study (GWAS) datasets are used for population structure correction. Population structure can be a strong confounding factor and if efforts are not taken to detect and correct for it then misleading associations may be discovered (i.e., associations that are related to population structure rather than the phenotype of interest).

In one example, it is presumed that the leading principal components of the genotype data correspond to the population structure. By detecting these leading components and using them to correct the association mapping, such as by incorporating them explicitly in the model as additional features, the population structure effect may be reduced and true associations may be easier to discover.

However, modern GWIS datasets can be of quite large scale (n×m, with m in the order of millions and n in the order of thousands to tens of thousands). Some approaches for discovering the principal components typically rely on an eigen decomposition of the covariance matrix (either implicitly or explicitly), which may be accomplished using Householder transformations. Such an approach does not scale well to large matrices. Furthermore, these approaches are inefficient in cases where only the leading components instead of all components are to be extracted.

Figure 1:
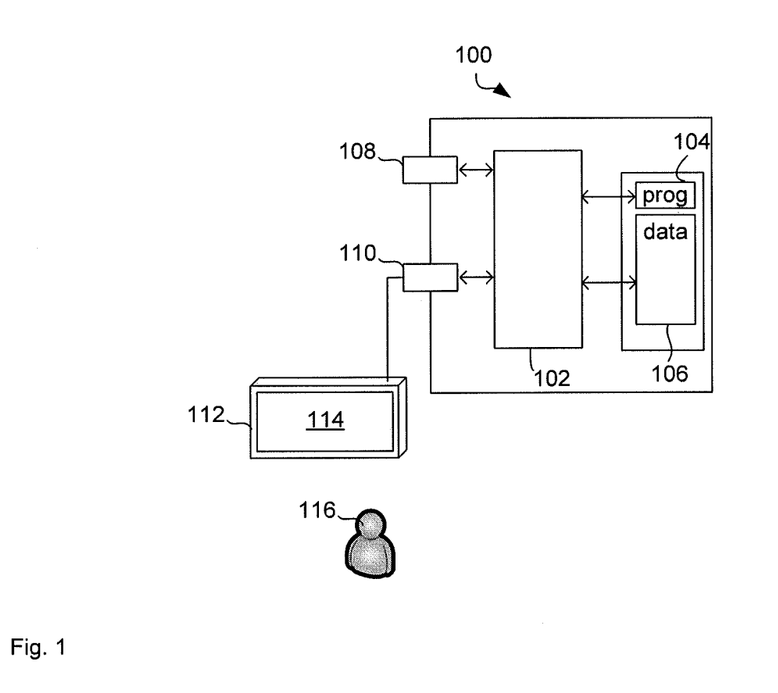
FIG. 1 illustrates a computer system for further approximating multiple data vectors of a dataset.

FIG. 1 illustrates a computer system 100 for further approximating multiple data vectors of a dataset. The computer system 100 comprises a processor 102 connected to a program memory 104, a data memory 106, a communication port 108 and a user port 110. The program memory 104 is a non-transitory computer readable medium, such as a hard drive, a solid state disk or CD-ROM. Software, that is, an executable program stored on program memory 104 causes the processor 102 to perform the method in FIG. 2, that is, to perform multiple iterations of determining an updated estimate of a further principle component.

The data memory 106 is shown to be located inside the computer system 100 but may equally be located elsewhere, such as in the form of a storage area network (SAN). The data memory 106 stores multiple data vectors of the dataset and one or more principle components that initially approximate the dataset. In many examples the dataset is significantly larger than the principal components and therefore, the principle components may not be stored on the same datastore as the dataset. For example, the principle components are stored on a local hard disk drive, flash drive or random access memory (RAM), while the dataset is stored on an external SAN.

The processor 102 may receive data, such as data of the dataset or the stored principle components, from data memory 106 as well as from the communications port 108 and the user port 110, which is connected to a display 112 that shows a visual representation 114 of the principal components to a user 116. In one example, the processor 102 receives data from a genome sequencer or other database via communications port 108, such as by using a Fibre Channel, PCI Express, Serial ATA, or InfiniBand connection. The dataset may be stored in a file, such as in PLINK format or a database, such as SQLite3.

Although communications port 108 and user port 110 are shown as distinct entities, it is to be understood that any kind of data port may be used to receive the dataset, such as a network connection, a memory interface, a pin of the chip package of processor 102, or logical ports, such as IP sockets or parameters of functions stored on program memory 104 and executed by processor 102. These parameters may be stored on data memory 106 and may be handled by-value or by-reference, that is, as a pointer, in the source code.

The processor 102 may receive data through all these interfaces, which includes memory access of volatile memory, such as cache or RAM, or non-volatile memory, such as an optical disk drive, hard disk drive, storage server or cloud storage. The computer system 100 may further be implemented within a cloud computing environment, such as a managed group of interconnected servers hosting a dynamic number of virtual machines.

It is to be understood that any receiving step may be preceded by the processor 102 determining or computing the data that is later received. For example, the processor 102 determines a principle component and stores the principle component in data memory 106, such as RAM or a processor register. The processor 102 then requests the data from the data memory 106, such as by providing a read signal together with a memory address. The data memory 106 provides the data as a voltage signal on a physical bit line and the processor 102 receives the principle component via a memory interface.

Figure 2:
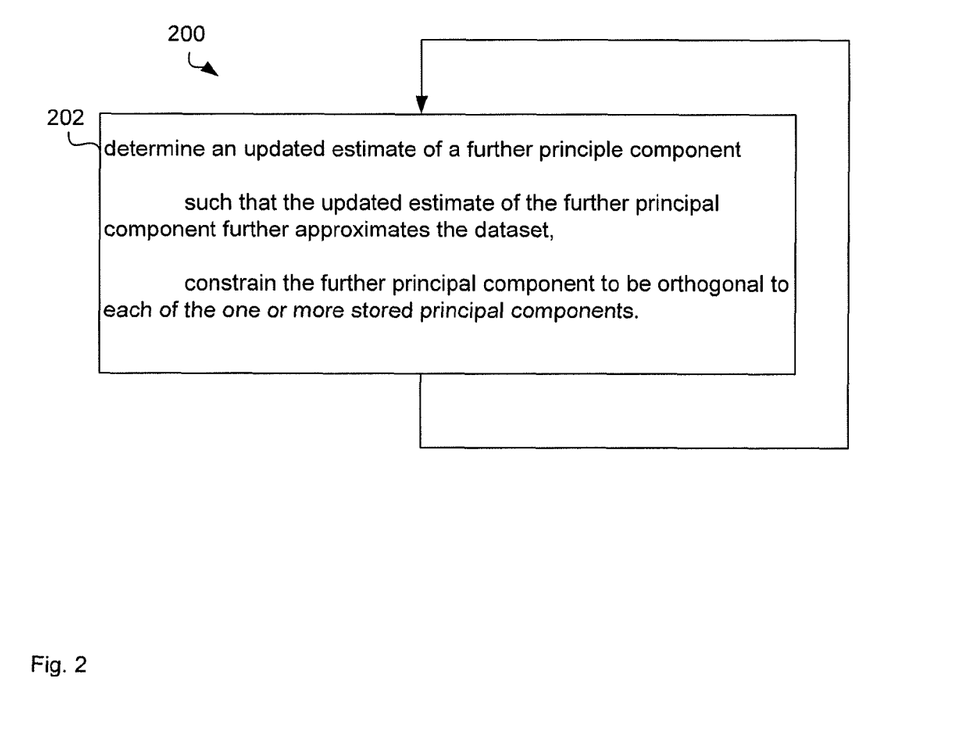
FIG. 2 illustrates a method for further approximating multiple data vectors of a dataset.

FIG. 2 illustrates a method 200 as performed by processor 102 for further approximating multiple data vectors of a dataset. Further approximating means that the dataset is approximated but this initial approximation is only a rough approximation and a finer approximation is to be computed.

Figure 3A:
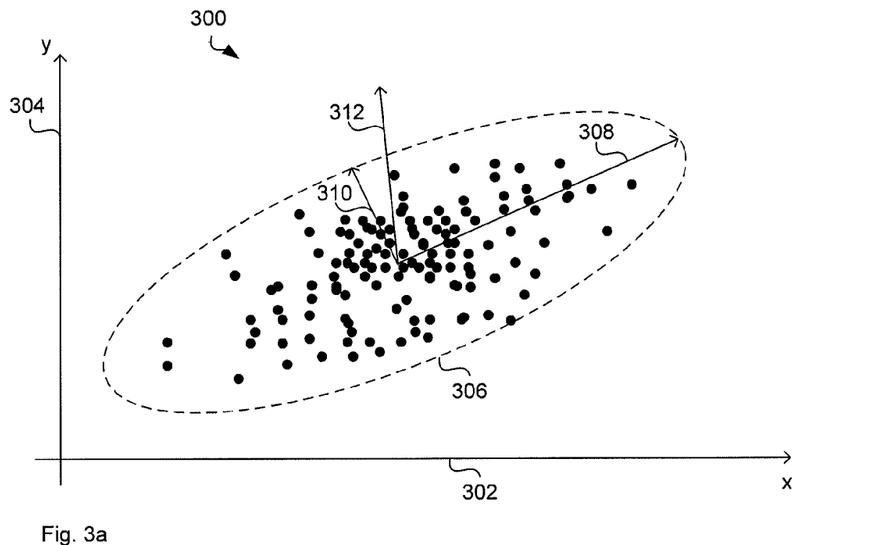
FIG. 3a illustrates a scatter plot of a dataset.

FIG. 3a illustrates a scatter plot 300 of a dataset comprising a number of data points represented by respective solid disks each located on a space defined by a first dimension 302 and a second dimension 304. In this two-dimensional example, each data point represents a two-dimensional data vector d=[x, y].

Scatter plot 300 represents a two-dimensional correlated Gaussian distribution with a 3σ limit indicated by an ellipse 306. By definition, the major axis 308 of ellipse 306 represents the first principle component of the dataset 300 and the minor axis 310 of ellipse 306 represents the second principle component of the dataset.

Figure 3B:
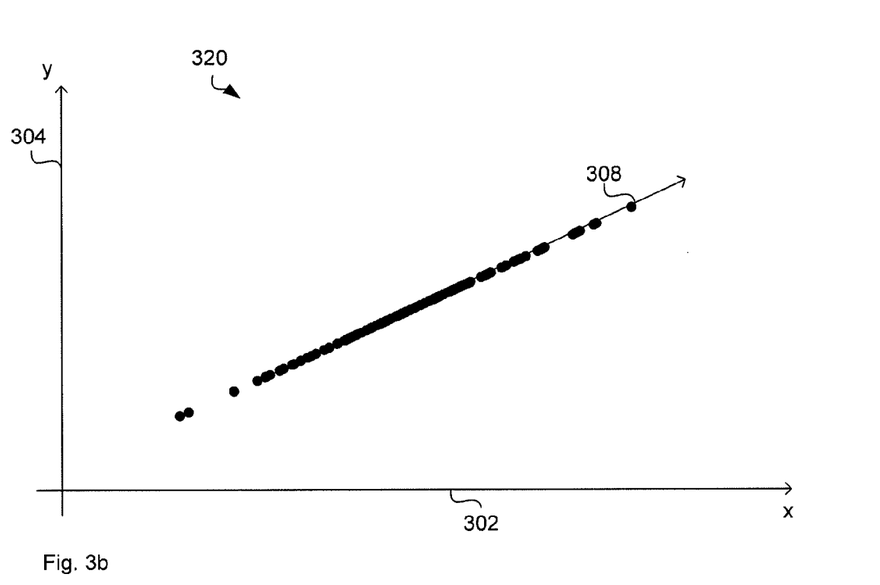

FIG. 3b illustrates an approximation 320 of the dataset where for each data point only the length along the first principle component 208 is stored. As can be seen when comparing FIG. 3b to FIG. 3a, the dataset is roughly approximated by the first principle component 308. Identifying the second principal component 310 and storing for each data point the length along second principal component 310 on datastore 106 further approximates the dataset and in this case, would exactly represent the original data set.

In one example, the initial approximation is computed by performing Principle Component Analysis (PCA) on the dataset using the following non-linear iterative partial least squares (NIPALS) method. In basic terms, this method selects an initial estimate vector 312 randomly, for example, and iteratively updates the estimate vector 312 according to the below update formula. In each iteration, the estimate vector 312 moves closer to the first principal component 308, that is, the dominant principal component. The basis of each of the vectors 308, 310 and 312 may be the mean value of the dataset 300, which is relatively easy to compute.

Let the dataset $X \in R^{nm}$ be a n×m matrix with n rows and m columns representing a GWAS dataset, where each column represents an observation, such as an individual, and each row represents a variable, such as a particular allele. Processor 102 is programmed to find the principal eigenvector a of the covariance matrix $X^T X$.

Define loadings $\beta := Xa$; by the definition of eigenvectors, we have $X^T\beta = \lambda a$ for eigenvalue $\lambda > 0$. Given loadings $\beta$, an estimate of a is therefore $$a = \frac{X^T \beta}{\lambda}$$

with $\lambda = \|X^T\beta\|$. This can be used in the following algorithm, which is similar to a Power Algorithm:

Definition 1 NIPALS
1. Initialise random $a^{(0)} \in B$ from the unit ball B.
2. $t \leftarrow 0$
3. Repeat until converged:

(a) $\beta^{(t)} \leftarrow Xa^{(t)}$ (b) $\lambda^{(t+1)} \leftarrow \|X^T\beta^{(t)}\|$ (c) $a^{(t+1)} \leftarrow \frac{X^T \beta^{(t)}}{\lambda^{(t)}}$ It can be shown that the procedure converges to the principal eigenvector and not subsequent eigenvectors. To find subsequent eigenvectors, NIPALS applies the same algorithm as Definition 1 on a modified matrix $X' = X - \lambda \otimes a$, where $\lambda$ and a are the principal eigenvalue and eigenvector already discovered. In the example of FIG. 3a, this means excluding contributions along the first principal component 308.

Figure 3C:
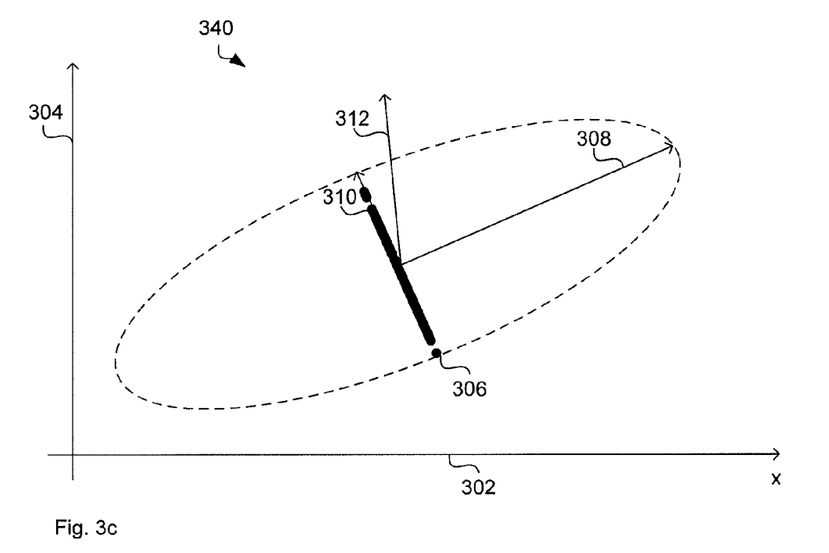
FIG. 3c illustrates a reduced dataset.

FIG. 3c illustrates a reduced dataset 340 where the contribution of the first principal component 308 is excluded. It is to be understood that most practical applications comprise many more dimensions, so excluding the first dimension does not directly lead to the second principal component 310 as show in FIG. 3c but to a smaller dataset 340 with up to m−1 further principal components.

However, modern GWAS datasets have two desirable properties: they are discrete with small alphabet size, such as GATC for the four amino acid bases, and they are sparse, which means most positions of dataset matrix X are vacant. Performing such a excluding transformation often destroys both these properties in the remaining dataset 340. It is desirable to maintain these properties as they allow significant computational speedups and memory reduction, detailed further on.

An efficient matrix representation reduces memory consumption and increases computational efficiency.

Figure 4:
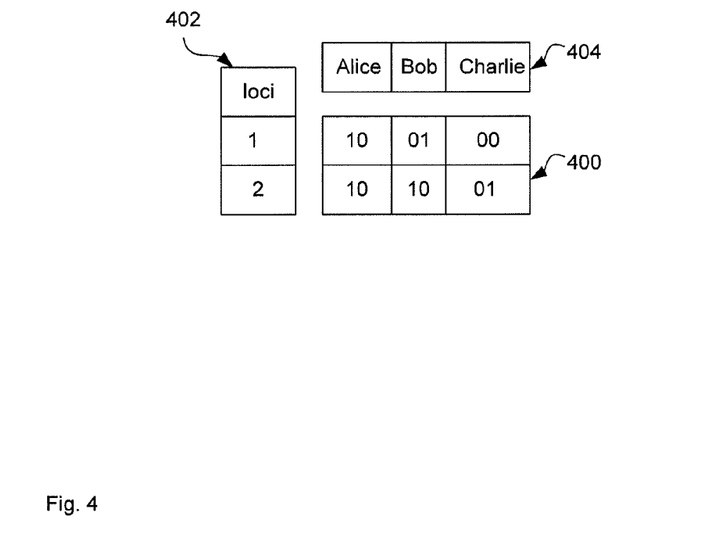
FIG. 4 illustrates a dataset of a Genome-Wide Association Study.

FIG. 4 illustrates a dataset 400 of a GWAS. For illustration purposes, a description of the rows 402, that is the variables, as well as a description of the columns 404, that is the data vectors or observations, is also provided but these descriptions 402 and 404 may be stored separately or not at all.

One example of representing genotypes is $X_{ij} \in \{0, 1, 2\}$ with 0, 1, 2 representing two homozygote variants (major and minor, represented by 0, 2) and a heterozygote (1). This model, hereby referred to as the dosage model, assigns numerical quantities to homozygote and heterozygote alleles. When directly used in PCA, however, it results in the assumption that heterozygote alleles have ½ the effect of the homozygotes as PCA is a linear operation.

This assumption assumes that such a linear relationship exists which may lead to inaccuracies. In another example, a different representation is used: $X_{ij} \in \{0, 1\}^2$, that is minor homozygote and heterozygote alleles are represented by binary indicators. The major homozygote can be inferred by the absence of both indicators.

In the example of dataset 400, the genome of three individuals, Alice, Bob and Charlie, have been sequenced and all three suffer from a particular disease. The dataset comprises data on two different loci 1 and 2. At loci 1 four alleles (variants) a, b, c and d are known. At loci 2 three alleles a, b and c are known. In this example, the alleles are not represented separately but only whether the individual has an allele that is different to the most frequent allele, that is, the major allele. In the example of FIG. 4, the major allele for loci 1 is d and major allele for loci 2 is b.

Alice is minor homozygote for loci 1 and allele a, which means that she has an allele in both chromosomes at loci 1 that is different to the allele at that loci for the majority of the population. This is represented by value '10' in the corresponding cell. Alice is also minor homozygote for loci 2 and allele a indicated again by value '10'. Bob is heterozygote for loci 1 and allele b and c, which means one chromosome carries allele a and the other carries allele c. This is indicated by a single value '01' in the corresponding cell. Like Alice, Bob is also minor homozygote for loci 2 and allele a. Charlie is major homozygote for loci 1 and allele d, which is represented by value '00' and is heterozygote for loci 2 and alleles b and c indicated by single value '01'.

In another example, as the elements $X_{ij}$ are binary they may be represented and stored on data store 106 using packed binary representation, that is encoding one element as one bit. For an n×m matrix, the number of elements is 2 nm, as each element is encoded with two binary indicators. Thus, the number of bytes required to store the matrix is $$\frac{nm}{4}.$$

In comparison, the sparse format requires $$\frac{2nm}{3},$$

if each element is represented by a 16-bit offset. This is significantly more space, but on the other hand the sparse matrix allows faster matrix products.

Sparse matrices may be stored on data store 106 by only recording the locations of non-zero elements. Processor 102 could achieve this using only a simple array containing a list of indices that are non-zero. Absolute references with full 64-bit int pointer allow for matrices with more than $2^{32}$ elements (say a 65,536×65,536 square matrix).

In another example, processor 102 stores relative offsets from the previous non-zero elements, allowing 16-bit per non-zero element of storage (assuming modest sparsity–at least one non-zero element every 216).

The sparse datatype therefore has a list of non-zeros (nz) where the index of the i-th non-zero element is given by the cumulative sum of the first i elements from the nz array. Matrix-vector products are therefore especially efficient: Processor 102 can simply hop along the non-zero elements by summing along the nz array, adding up the corresponding elements in the vector. Transposed matrix-vector products are equally efficient, with a simple inversion of the index calculations for the destination and source vectors.

Bit packed matrices can be represented simply as a byte array. A given element has value equal to the corresponding bit in the byte array. Matrix-vector products are more complicated in this representation. Processor 102 checks every bit to see if it is non-zero. If it is, then the vector sum is updated. Like before, transposition is a simple inversion of the indices into the final vector and the source vector. For convenience, bits may be packed in little-endian like order, that is bit 0 is the right-most bit, bit 7 is the left-most bit.

Matrices are stored on disk in a binary compact format. The leading bytes of a file is a magic string for rapid type checking. Following the magic string are two 64-bit unsigned numbers specifying the number of rows and columns. The next byte specifies which type of matrix is stored (sparse or bitpacked), and all subsequent bytes form the data.

One example is set out here:

Magic string|Num. Rows|Num. Cols|Format|Data . . .

The subsequent data is intended to be directly mappable to nz for sparse arrays and data for bitpacked matrices. It is therefore possible to mmap it instead of actually reading the bytes into memory. The magic header may be a 6-byte ASCII sequence, with the last byte being a version number.

The data section of a sparse matrix is the number of entries in the nz array, represented as a 64-bit unsigned int, followed by the nz array itself as unsigned 16-bit integers:

Num. entries (unsigned 64-bit int)|entry (unsigned 16-bit int) . . .

For bitpacked matrices, the length of the data section is already known from the number of rows and columns as no compression takes place. Thus, the elements can be read in directly.

As sparse matrices are compressed, it is difficult to determine the final size without first reading the input matrix to obtain the count of non-zero elements. Furthermore, the optimal base allele may not be the the allele encoded as 0 in the text file. Thus, for maximum compression processor 102 counts the alleles and the majority allele used as the base. Building a sparse matrix thus involves reading the file twice, once to determine dimensions and compression and once more to build the actual sparse matrix.

Processor 102 uses counters for the current row and the number of columns. Before processor 102 reads the first non-empty line, the number of columns is unknown. After the line is read, the number of columns should remain constant throughout the entire file. It can therefore be used as a loop invariant. Counters for the frequency of each allele (3 in our case) are also used to determine the majority allele.

Processor 102 splits lines into fields using the delimiter specified with command line arguments. If the number of columns is unknown, it is updated. Otherwise, it is used as an invariant to check the consistency of the input file.

After counting the frequency of the alleles, processor 102 determines the majority allele and the number of non-zero elements (taking the major allele as "zero" in the sparse data matrix). Now that dimensions and compression is known, the input file can be reread and the sparse matrix built. The sparse matrix uses the majority allele as a base (zero) encoding to maximise efficiency of the data structure.

The parser mirrors the internal data structure of a sparse matrix (rows, cols, nz array). Additionally, there are three counters used to calculate the offsets: tail (number of elements written to nz array so far), cnt (number of elements read from the input file, and lent (position of last non-zero element). As the major allele may not be the zero allele, a small table is used to remap alleles when reading to make the major allele the zero allele.

Mapping alleles for a current row involves a lookup into this table. Note that invalid values (indexing outside the mapping table) are mapped to zero—this corresponds to imputing invalid genotypes as the major allele, which has some statistical sense.

With the alleles now remapped, the offsets for all non-zero alleles can be calculated and added to the array. As processor 102 is recording offsets as 16-bit integers, there is a limit to the sparseness: offsets are smaller than 65535 to prevent overflowing the 16-bit int.

Bitpacked matrices are simpler than sparse matrices to create as processor does not calculate a frequency table for alleles, but uses the dimensions of the matrix. Processor 102 still performs two passes through the file. Calculating the dimensions is a matter of counting the number of lines in a file (excluding blank leading lines) and the number of columns in a line.

Rows may be double here as in sparse matrices due to the genotype expansion.

Determining which bit to set depends on the genotype. Zeros and invalid genotypes are not coded, ones are coded in position (row, col), and twos are encoded as (n+row, col)—that is the two genotype is blocked after all the one genotypes.

Given an index into the matrix, flipping is achieved by pulling out the byte containing the index bit and flipping the corresponding bit to 1.

Similar to NIPALS, the method 200 of FIG. 2 also performs 202 multiple iterations of determining an updated estimate of a further principle component. However, in method 200 this determining step 202 is based on the multiple data vectors that are initially approximated by the one or more stored principle components. This means, referring to FIG. 3a, determining the further principle component 310 is based on the original dataset 300 since the original dataset 300 is initially approximated by the first principal component 308. In other words, the transformation to exclude the contributions along first principal component 308 is not performed.

As above, processor 102 starts with an initial estimate vector 312, which is an estimate of the second principal component 312, and determines an updated estimate such that the updated estimate 312 of the second principal component 310 further approximates the dataset 300. In contrast to the above NIPALS method, in each iteration processor 102 constrains the second principal component 310 to be orthogonal to the first principal component 308 stored on datastore 106.

As a result of this constraint, the updated estimate 312 does not converge towards first principle component 308 but towards the second most dominant principal component in dataset 300.

Definition 2: IPCA Let V={$a_i$} be the set of already discovered eigenvectors (V=Ø when discovering the leading component), that is, one or more stored principle components that initially approximate the dataset X (reference 300 in FIG. 3a).

1. Initialise random $a^{(0)} \in B$ from the unit ball B.
2. $t \leftarrow 0$
3. Repeat until converged:

$$\beta^{(t)} \leftarrow Xa^{(t)} \quad \text{(a)}$$

$$\lambda^{(t+1)} \leftarrow \|X^T\beta^{(t)}\| \quad \text{(b)}$$

$$a^{(t+1)} \leftarrow X^T\beta^{(t)}\backslash V \quad \text{(c)}$$

where the \ operator represents orthonormalisation defined as

Definition 3 Let a be a vector and V be a set of vectors. Then, a':=a\v is the vector a' such that $\|a'\|=1$ and $<a, v>=0$ for all $v \in V$.

In one example, processor 102 performs Gram-Schmidt orthonormalisation to determine such a vector a'.

Since the stored principle components are already orthogonal, the Gram-Schmidt process is only performed on the updated estimate. Performing the Gram-Schmidt process the processor 102 subtracts from $X^T\beta^{(t)}$ components of the stored principal components. Therefore, processor 102 computes a' as $$a' = a - \sum_{j=1}^{k-1} proj_{u_j}(a)$$

where $u_j$ are the stored principal components and $$proj_u(v) = \frac{\langle u, v \rangle}{\langle u, u \rangle} u$$

The iteration at item 3 of the method in Definition 2 comprises two multiplications of the dataset X with vectors $\alpha$ and $\beta$, respectively. These multiplications represent linear combinations of the multiple data vectors in the dataset with weight factors as given by the vectors $\alpha$ and $\beta$. Step (c) comprises determining the updated estimate 312 of the second principal component 310 based on a linear combination of the data vectors of dataset X according to vector $\beta$, that is, the matrix-vector product $X^T\beta^{(t)}$. Again, the dataset X is the original dataset without the excluding transformation.

The vector $\beta$ is referred to as score vector and in step (a) processor 102 determines the score vector $\beta$ based on another linear combination of the data vectors, which is based on the estimate a 312 of the second principal component 310.

Processor 102 performs multiple iterations of item 3 until a convergence criterion is met. Convergence can be detected by examining the change $|\lambda^{(t+1)}-\lambda^{(t)}|$. Once an acceptable precision has been reached (the condition $|\lambda^{(t+1)}-\lambda^{(t)}| e$ for some small e), the loop can be terminated. In one example, e is 1E-6.

Once the convergence criterion is met, which means that the estimate 312 is sufficiently close to second principal component 310, processor 102 adds the estimate 310 to the stored first principal component 308, such that both principal components are stored on datastore 106. Processor 102 may also store the corresponding eigenvalue X associated with the determined principal component on datastore 106.

Processor 102 can then repeat method 200 and determine a third principle component that is orthogonal to the first and second principle components. In the same manner, processor 102 can determine further principle components that are orthogonal to the stored principal components without transforming the dataset.

Processor 102 may normalise the eigenvalues $\lambda$ by $$\frac{1}{\left(\sqrt{n} + \sqrt{m}\right)^2}$$

A threshold thr then specifies the minimum eigenvalue threshold—component search is stopped after the eigenvalue falls below this value. The default threshold is 0.5 to discover subpopulations if the above normalisation is used. A maximum number of iterations may also be specified to take before aborting due to non-convergence—the default, 100, should be sufficient (indeed generous) for most applications. A cap on the number of leading components to find may be provided. If the first 10 components are desired for example, without a limit on the size of the eigenvalues, then the flags −m 10−T 0 will retrieve exactly 10 components. If the eigenvalue does not satisfy the minimum threshold specified, then processor 102 has found all the components necessary and can terminate the search.

In one example, after determining a predetermined number of principle components processor 102 creates a graphical representation of the output data based on the principle components. The processor 102 may disregard the most dominant principal components in order to perform population structure correction. The next most dominant principal components indicate the most significant variables in the dataset, such as most significant alleles for a particular disease.

Figure 5:
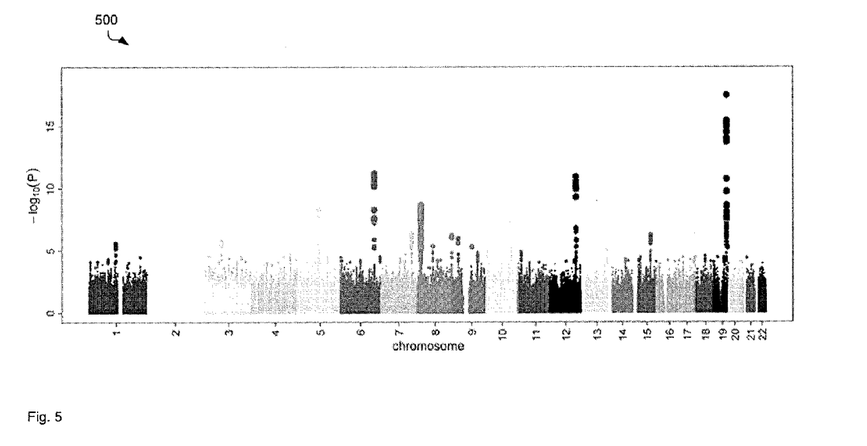
FIG. 5 illustrates a Manhattan plot for a particular disease.

FIG. 5 illustrates a Manhattan plot 500 for a particular disease, where the x-axis represents the genomic location and the y-Axis represents the association level, which may be identical to the eigenvalue $\lambda$, and each dot represents a single-nucleotide polymorphism (SNP). Since principle component analysis finds principle components that are in general combinations of the input variables, the Manhattan plot 500 may also show combinations of SNPs or alleles on the x-axis. This way, a person looking at the Manhattan plot 500 can easily identify which combination of SNPs or alleles is the most significant for that particular disease. The Manhattan plot 500 can serve as a valuable tool for creating diagnostic devices for the early detection of genetic risk factors for a particular disease.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A computer implemented method for further approximating multiple allele vectors of a Genome-Wide-Association Study (GWAS) dataset, the multiple allele vectors being initially approximated by one or more principle components stored on computer memory, the method comprising:
   receiving the GWAS dataset from a genome sequence;
   storing the multiple allele vectors of the GWAS dataset in a discrete and sparse form by storing only locations of non-zero elements in computer memory, the non-zero elements indicative of differences to majority alleles and the discrete form comprises a selection of elements from an alphabet;
   performing by a computer processor multiple iterations of determining an updated estimate of a further principle component based on the multiple allele vectors in the discrete and sparse form that are initially approximated by the one or more stored principle components, and storing the updated estimate on computer memory such that the updated estimate of the further principal component further approximates the GWAS dataset,
   wherein in each iteration determining the updated estimate of the further principle component comprises constraining the updated estimate of the further principal component to be orthogonal to each of the one or more stored principal components,
   wherein the method further comprises determining a first linear combination of the multiple allele vectors in the discrete and sparse form, wherein determining the updated estimate of the further principle component based on the multiple allele vectors in the discrete and sparse form is based on the first linear combination of the multiple allele vectors,
   wherein the method further comprises determining a score based on a second linear combination of the multiple allele vectors in the discrete and sparse form, wherein the first linear combination is based on the score and the second linear combination is based on the updated estimate of the further principal component, and
   wherein performing multiple iterations of determining the updated estimate of the further principle component comprises repeating the steps of determining the updated estimate of the further principal component based on the score and of determining the score based on the updated estimate of the further principal component to iteratively update the score and the estimate of the further principal component until a convergence criterion is met and then storing the updated estimate of the further principle component by adding the updated estimate of the further principal component to the one or more principal components stored on the computer memory.

2. The method of claim 1, further comprising performing population structure correction based on the one or more stored principal components and the further principal component.

3. The method of claim 1, further comprising storing the dataset as a packed binary representation on a data store.

4. The method of claim 3, wherein each of minor homozygote, major homozygote and heterozygote is represented by a different binary value.

5. The method of claim 4, wherein the binary value is a two bit binary value.

6. The method of claim 1, further comprising creating a graphical representation of the data set based on the stored principal components.

7. A non-transitory computer readable medium with an executable program stored thereon that when executed causes a computer to perform the method of claim 1.

8. A computer system for further approximating multiple allele vectors of a Genome-Wide-Association Study (GWAS) dataset, the computer system comprising:
   a data store to store the GWAS dataset in a discrete and sparse form by storing only the locations of non-zero elements in computer memory, the non-zero elements indicative of differences to majority alleles and the discrete form comprises a selection of elements from an alphabet, and one or more principle components that initially approximate the allele vectors;
   a processor to perform multiple iterations of determining an updated estimate of a further principle component based on the multiple allele vectors in the discrete and sparse foul' that are initially approximated by the one or more stored principle components and to store the updated estimate on the data store, such that the updated estimate of the further principal component further approximates the GWAS dataset,
   wherein in each iteration determining the updated estimate of the further principle component comprises constraining the updated estimate of the further principal component to be orthogonal to each of the one or more stored principal components,
   wherein the processor is configured to determine a first linear combination of the multiple allele vectors is the discrete and sparse form, wherein determining the updated estimate of the further principle component based on the multiple allele vectors is the discrete and sparse form is based on the first linear combination of the multiple allele vectors,
   wherein the processor is further configured to determine a score based on a second linear combination of the multiple allele vectors in the discrete and sparse form, wherein the first linear combination is based on the score and the second linear combination is based on the updated estimate of the further principal component and, wherein performing multiple iterations of determining the updated estimate of the further principle component comprises repeating the steps of determining the updated estimate of the further principal component based on the score and of determining the score based on the updated estimate of the further principal component to iteratively update the score and the estimate of the further principal component until a convergence criterion is met and then storing the updated estimate of the further principle component by adding the updated estimate of the further principal component to the one or more principal components stored on the computer memory.

* * * * *